United States Patent Office 3,304,188
Patented Feb. 14, 1967

---

3,304,188
PROCESS FOR DEAD-BURNING DOLOMITE
Vaughn V. Hughey, Tiffin, Ohio, assignor to Basic Incorporated, Cleveland, Ohio, a corporation of Ohio
No Drawing. Filed May 18, 1965, Ser. No. 456,844
11 Claims. (Cl. 106—58)

This invention relates generally as indicated to a process for producing dead-burned dolomite, and more particularly relates to such a process in which dolomitic quicklime is hydrated under pressure to hydrate fully the calcium and magnesium content prior to formation of the refractory and dead burning thereof.

Dead-burned or sintered dolomitic refractories, which are prepared by high temperature calcination and sintering of dolomitic ores, are extensively used in the steel industry for repair of the hearth linings of basic electric and open-hearth furnaces. Such refractories are also employed in the form of bricks for the working linings of oxygen steel converters which are used with the oxygen conversion process which is becoming increasingly popular in the production of steel.

One principal problem in the production of dolomitic refractories which has persisted over the years is that of developing heat treating means which will yield dead-burned products of low porosity and also of high refractoriness, i.e., containing a low content of fluxing impurities. Dead-burned dolomitic refractories have been and are produced by admixing dolomite with pieces of coke and sintering such admixtures in shaft kilns, wherein the combustion of the coke furnishes the necessary heat for sintering. This process, however, has the disadvantage that the residual ash from the coke which is present during sintering adds to the impurities in the final dead-burned product.

Another process which is used commercially to produce such refractories is one in which substantial quantities of various fluxing agents such as iron oxides, and less commonly clays and silica, are mixed with the dolomite stone prior to sintering in a rotary kiln. Dolomitic refractories produced by this process also contain substantial quantities of impurities and thus do not have sufficiently high refractoriness to meet the demands of present-day steel making processes, such as the above-mentioned oxygen conversion process, wherein considerably higher temperatures are used to obtain greater melting and refining rates.

The situation with which the refractory manufacturer is thus confronted is quite complex and difficult, since fluxing agents are quite desirable, and indeed have heretofore been considered essential, during sintering to assist in the shrinking of the article which occurs during such process. These agents or impurities, however, form compounds with calcium oxide (and to a lesser degree with magnesium oxide) having lower melting points than the refractory itself, which tend to melt and form liquids when the refractory is subjected to the high temperatures of the steel-making processes and are therefore extremely undesirable and troublesome ingredients.

Recent attempts to solve this problem have been directed to the use of relatively small quantities of fluxing impurities to produce the dead-burned refractories. One such process is that described in U.S. Patent No. 3,074,806, in which a dolomitic quicklime is admixed with a small quantity of fluxing agents and compacted under pressure prior to sintering to form the desired refractory. While such process produces dolomitic refractories of lower porosity and significantly improved refractoriness, the refractories nevertheless still contain the objectionable impurities.

It is accordingly an object of this invention to provide a process for the production of dead-burned dolomitic refractories which are of lower porosity and are more stable and more resistant to hydration than those previously known.

Another object of this invention is to provide a process for producing dead-burned dolomitic refractories which avoids all additions of fluxing agents.

It is an additional object of this invention to provide a process for producing dolomitic refractories in which the intermediate products, either powders or briquettes, are essentially fully hydrated and may therefore be stored without special protection from moisture laden air.

Other objects, features, and advantages of this invention will become apparent after a reading of the following more detailed description.

These and other objects are achieved by means of this invention in which a process for producing dead-burned dolomitic refractories is provided which includes the complete hydration of a dolomitic quicklime so that both the calcium and magnesium contents thereof are converted to the hydroxides prior to forming and sintering of the refractory article. The preferred process therefore comprises calcining dolomite to produce dolomitic quicklime, which is an intimate mixture of calcium oxide and magnesium oxide, hydrating the quicklime under pressure to hydrate essentially all of the calcium and magnesium contents, and subsequently forming and sintering or dead burning the desired refractory article.

The process of the present invention may be carried out using any type of dolomite rock presently available, including those of highest purity, such as the Niagaran dolomite limestone deposits found in Northwestern Ohio which generally contain only a small fraction of impurities. It is particularly preferred that a naturally occurring dolomite be used, as such single calcium and magnesium oxide-bearing material provides a much desired intermixing of the oxides of a far greater order of intimacy than is possible by mechanical mixing of the separate oxides, since in the dolomite crystal, the magnesium and calcium atoms occupy uniformly repetitive positions in the crystal lattice. As a result, after calcination of the crystal and hydration of the resulting quicklime, the molecules of magnesium hydroxide and calcium hydroxide remain intimately interspersed to much the same extent as in the original dolomite crystal, thereby facilitating the production of refractories of increased density. As will be shown by the specific examples which follow, it is possible, using the present process, to produce dead-burned dolomitic refractories which have densities of about 3.2 grams per cubic centimeter or greater from such dolomite without the addition of any fluxing agents.

The dolomite may be first calcined in any suitable and economical type of kiln, such as any of the commercial shaft or rotary kilns, and such calcination will generally take place at a temperature below about 2600° F. The fuel used to fire the particular kiln may be that which is most suitable for economical operation, so long as its use does not introduce excessive amounts of impurities into the quicklime. With rotary kilns, the most common fuels are coals of moderate or low ash content, gas or fuel oil. Shaft kilns which may be used are of various types, with one such type suitable for use in this invention being the Arnold kilns commonly used in Northwest Ohio, which are heated by means of coal-fired Dutch ovens opening into the lower part of the kiln. Azbe type shaft kilns may also be used, which are fired with producer or natural gas.

The size of the dolomite rock fed into the kiln is naturally that which is suitable for the most efficient use of the particular kiln which is employed and thus may be readily determined for any given kiln. The quicklime which is produced within the kiln from the dolomite should be well calcined, with a residual ignition loss of about ten percent or less, with five percent or less being preferred.

The dolomitic quicklime is hydrated under sufficient pressure and in the presence of sufficient water to obtain a fully hydrated product, that is one in which essentially all of the calcium and magnesium contents have been completely converted to the hydroxide state. The hydration may be performed in any conventional apparatus which is commercially available for such purpose, with one especially suitable apparatus being that disclosed in U.S. Patent 2,356,760. In order to achieve full hydration of both the calcium oxide and the magnesium oxide of the quicklime, it is usually hydrated in the pressure vessel or autoclave under a steam pressure of from about 75 to about 150 pounds per square inch gauge pressure, although lower or higher pressure may be employed, with the hydration time varying inversely with the pressure. To achieve full hydration at practical operations, however, the quicklime is usually hydrated above atmospheric pressure, for otherwise only the calcium oxide will be converted to the hydroxide.

The hydration time varies, as mentioned above, depending upon the pressure. At a hydration gauge pressure of approximately 140 pounds per square inch, about 15 to 20 minutes is generally required for complete hydration of the quicklime. For such hydration, it is also generally necessary to use at least about 25 weight percent of water, although in practice an excess of water is used to increase the pressure within the vessel to facilitate complete hydration.

The hydrate is generally ground to a small particle size to facilitate formation into the refractory article, preferably to a particle size such that the hydrate essentially passes a 28 mesh Tyler sieve, but the particular particle size may be varied as desired.

The hydrate may be formed into the desired refractory article in any suitable conventional equipment. For example, the hydrate may be pressed into pellets or briquettes in any suitable type of press which will develop sufficient pressure to give a strongly coherent dense briquette which is capable of withstanding the rough handling of conveying equipment such as bucket elevators and the tumbling in a rotary kiln. The press may be hydraulically or mechanically actuated, and for large kiln operations, a double roll briquetting press is quite suitable. Pressing pressures of about 4500 pounds per square inch have been found satisfactory, although higher pressures may be used ranging up to approximately 30,000 pounds per square inch, and in some instances, are preferable in order to obtain strong briquettes with better resistance to abrasion during handling and feeding. The briquettes should be of such a shape that at least one dimension thereof is less than about 0.75 inch to permit proper penetration of heat within a reasonable length of time.

Briquettes formed as above may be used immediately or may be stored in bins ahead of the kiln which is used for the dead burning or sintering. It has been found that the briquettes actually tend to harden and become stronger if they are permitted to cure in such bins for approximately 24 hours; however, very acceptable articles are produced if the briquettes are dead burned immediately after formation.

The formed refractory may be dead burned in any suitable rotary or shaft kiln having an inner refractory lining which is capable of withstanding the desired high temperatures. One particular suitable kiln is the shaft kiln described in Canadian Patent 680,552. The fuel used for firing the kiln may be natural gas, fuel oil, powdered coal, or any other fuel which is capable of yielding temperatures of above about 2600° F., and preferably within the range of about 3100 to 3400° F. which is the preferred dead-burning temperature range, since the higher temperatures facilitate sintering of the briquettes to a dense mass in a more rapid and efficient manner. The use of natural gas or fuel oil is preferred, since these fuels do not introduce additional impurities into the product, such as occurs when coal is used.

The sintering time, of course, varies with the sintering temperature, with less sintering time being required at the higher temperatures. It has been found, for example, that a burning time of approximately 20 to 25 minutes at about 3400° F. produces a dead-burned product of satisfactory density. The sintering time will generally range from approximately 20 minutes to about 4 hours, although longer times may be used if desired, and the temperature will normally be in the range of from about 3100 to 3400° F.

In general, the dead-burned refractory should have a hydration resistance of about 2 percent or less to be a satisfactory product. The procedure for determining the hydration is the Keim vapor method which is thoroughly explained in the July 15, 1959 edition of the American Ceramic Society bulletin, volume 38, No. 7 and will only briefly be described here. 500 milliliters of distilled water is placed in a hydrator and is heated to approximately 99 or 100° C. for at least 30 minutes. At the end of this time, 20 gram samples of crushed —4+8 mesh (Tyler) dead-burned dolomite are placed into tared porcelain crucibles, which are placed on the tripod in the hydrator. After a hydration period of three hours, the crucibles are transferred to a mechanical convection drying oven and are dried for two hours at 105° C. Samples are thereafter cooled in a desiccator and weighed. The percent of hydration susceptibility is defined as being the gain in weight divided by the sample weight times 100.

The success of the present invention is quite surprising since it has been found, as will be shown by the specific examples which follow, that when a dolomitic quicklime is hydrated with relatively small quantities of water and under low pressure (whereby only partial hydration is achieved), the resulting hydrate, when briquetted and dead burned, gives a final refractory product with considerably less resistance to hydration and of greater porosity, i.e., lower density, than refractories produced directly from the quicklime. It is only when sufficient water and sufficiently high steam pressures in the autoclave are used so that substantially complete hydration is achieved that the resulting hydrate gives a markedly improved product after briquetting and dead burning.

This invention will be better understood by reference to the following specific but non-limiting examples.

*Example 1*

A commercial calcined and fully hydrated dolomite meeting ASTM Specification C206–49 "Special Finishing Hydrated Lime," was used in this example. When analyzed for components other than calcium and magnesium, the analysis was as follows:

| | Weight percent |
|---|---|
| Loss on ignition | 25.87 |
| Silicon dioxide | 0.23 |
| Ferric oxide | 0.01 |
| Aluminum oxide | 0.13 |

The hydrated dolomite was pressed into briquettes in a hydraulic press operating under a pressure of about 15 tons per square inch. The briquettes were in the shape of cylinders approximately 1¼ inches in diameter by about ⅝ inch high. The pressed briquettes were thereafter sintered in a high temperature gas-fired Bickley furnace at 3400° F., with the temperature of the briquettes being maintained at this temperature for approximately 25 minutes.

The bulk density of the dead-burned refractory product was found to be 3.257 grams per cubic centimeter, and the hydration values of two samples were 1.48 and 1.32 percent, as determined by the previously described Keim vapor method.

*Example II*

The procedure of Example I was applied to a dolomitic lime hydrate with an ignition loss of 25.51 weight percent, and the briquettes were dead burned at a temperature of about 3200° F. for a period of about 1½ hours. The bulk density of the refractory was 3.226 grams per cubic centimeter. The hydration values of two samples were 1.39 and 1.34 percent.

*Example III*

The procedure of Example II was followed, with the briquettes being dead burned at a temperature of approximately 3100° F. The bulk density of the dead-burned product was 3.268 grams per cubic centimeter, and the hydration values of two samples tested were 1.96 and 1.48 percent.

*Examples IV–VI*

To demonstrate the increase in hydration resistance and density achieved through products produced by this invention, dead-burned dolomitic refractories were formed in which the hydration step was omitted. The briquetting and dead burning conditions of Examples IV, V and VI correspond identically with those of Examples I, II and III respectively. A commercial dolomitic quicklime, i.e., calcined dolomite, was used, and was analyzed for components other than calcium and magnesium:

|  | Weight percent |
|---|---|
| Loss on ignition | 1.68 |
| Silicon dioxide | 0.17 |
| Ferric oxide | 0.05 |
| Aluminum oxide | 0.17 |

The results of these examples as well as those of Examples I–III and VII–IX for convenience of comparison are set forth in Table I which follows.

*Examples VII–IX*

In order to demonstrate further the significant improvement obtained by the process of this invention, dead-burned dolomitic refractories were produced in which only partial hydration of the ore was achieved. For the purpose of these examples, a commercial hydrated dolomite meeting ASTM Specification No. C6–49 was used, which analyzed, for components other than calcium and magnesium as follows:

|  | Weight percent |
|---|---|
| Loss on ignition | 17.06 |
| Silicon dioxide | 0.13 |
| Ferric oxide | 0.02 |
| Aluminum oxide | 0.12 |

The briquetting and dead-burning conditions of Examples VII, VIII and IX correspond identically with those of Examples I, II and III respectively. The results of these experiments are also tabulated in Table I.

TABLE I

| Example | Material | Bulk Density, g./cc. | Hydration Value, Percent (Duplicate Samples) | |
|---|---|---|---|---|
| I | Full Hydrate | 3.257 | 1.48 | 1.32 |
| II | do | 3.226 | 1.39 | 1.34 |
| III | do | 3.268 | 1.96 | 1.48 |
| IV | Not Hydrated | 3.086 | 4.44 | 4.44 |
| V | do | 3.067 | 5.62 | 6.00 |
| VI | do | 3.003 | (1) | (1) |
| VII | Partial Hydrate | 3.155 | 3.39 | 3.24 |
| VIII | do | 3.105 | 5.61 | 6.28 |
| IX | do | 3.048 | (1) | (1) |

[1] Samples were so poor in hydration resistance that they had to be removed prior to completion of the hydration evaluation.

*Examples X and XI*

In these examples, varying quantities of water were added to the dolomitic quicklime in an open vessel so that only partial hydration of the quicklime was achieved. The calcined dolomite used was that described previously in regard to Examples IV–VI. In Example X, tap water was used for the hydration and in Example XI distilled water was used. The results of these examples are tabulated in Table II which follows.

*Example XII*

To provide a further contrast in the hydration resistance of dead-burned dolomitic products produced by this invention and those in which the hydration is omitted, the same dolomitic quicklime used in Examples X and XI was hydrated in an autoclave. 100 parts by weight of this calcined dolomite was admixed with 75 parts by weight of water, and set in an electrically heated autoclave. The pressure within the autoclave was raised to 80 p.s.i.g. and held at this pressure for approximately 1 hour. The product was thereafter cooled and dried at 265° F. The dolomite was then powdered, and briquetted and dead burned as previously described in Examples I–III. The bulk density and hydration resistance of samples from this run were determined and the results are set forth in Table II.

TABLE II

| Example | Percent Water | Bulk Density, g./cc. | Hydration Value, Percent | |
|---|---|---|---|---|
| X | 0 | 3.076 | 4.03 | 4.20 |
|  | 10 | 3.048 | 7.07 | 7.02 |
|  | 20 | 3.048 | 7.62 | 7.18 |
|  | 30 | 3.145 | 5.72 | 5.73 |
| XI | 0 | 3.076 | [1] 3.84 | |
|  | 10 | 3.095 | [1] 5.28 | |
|  | 20 | 3.095 | [1] 6.95 | |
|  | 30 | 3.155 | [1] 5.78 | |
| XII | (2) | 3.255 | [1] 1.35 | |

[1] Avg. 2 samples.
[2] Autoclave.

An analysis of the results set forth in Tables I and II readily indicates that the hydration resistance of dead-burned dolomitic refractories produced by this invention is appreciably greater than that of such products which have been produced from the unhydrated or partially hydrated dolomitic quicklime. Similarly, the bulk density of such products is also increased, being at least about 3.2 grams per cubic centimeter or greater. The results further show that it is only when substantial hydration pressures are used to give complete hydration of the lime and that the superior dead-burned refractories are obtained, with partially hydrated limes actually decreasing the hydration resistance and bulk density to a significant extent.

Other modes of applying the principle of the invention may be employed, change being made as regards the details described, provided the features stated in any of the following claims, or the equivalent of such, be employed.

I, therefore, particularly point out and distinctly claim as my invention:

1. A process for producing a dead-burned dolomitic refractory comprising calcining dolomitic stone to produce dolomitic quicklime, hydrating said quicklime under pressure to hydrate fully the calcium and magnesium content thereof, forming a refractory from said hydrated lime, and subsequently sintering said refractory.

2. The process of claim 1 in which said quicklime is hydrated under a pressure of about 75 to about 150 p.s.i.g.

3. The process of claim 1 in which said quicklime is hydrated in the presence of at least about 25 weight percent water.

4. The process of claim 1 in which the dolomitic stone is calcined at a temperature below about 2600° F.

5. The process of claim 1 in which the refractory is sintered at a temperature above about 2600° F.

6. The process of claim 1 in which the refractory is sintered at a temperature of about 3100 to 3400° F.

7. The process of claim 6 in which the refractory is sintered for a period of about 20 minutes to about 4 hours.

8. A process for producing a dolomitic refractory comprising calcining dolomitic stone to produce dolomitic quicklime, hydrating said quicklime above atmospheric pressure to hydrate fully the calcium and magnesium content thereof, briquetting said hydrated lime and subsequently sintering the briquettes.

9. A process for producing a dolomitic refractory comprising calcining a naturally occuring dolomite to produce dolomitic quicklime, hydrating said quicklime above atmospheric pressure to hydrate fully essentially all of the calcium and magnesium content thereof, grinding said hydrated lime, briquetting said lime to produce briquettes having at least one dimension less than about 0.75 inch, and subsequently sintering said briquettes.

10. The process of claim 9 in which the briquettes are formed under a pressure of at least about 4500 p.s.i.

11. In a process for producing a dead-burned dolomitic refractory comprising calcining dolomitic stone to produce dolomitic quicklime, forming a refractory shape from such quicklime, and subsequently sintering said refractory shape, the improvement comprising hydrating said dolomitic quicklime to hydrate fully essentially all of the calcium and magnesium content thereof prior to forming said refractory shape and sintering.

References Cited by the Examiner
UNITED STATES PATENTS 2,571,102 10/1951 Austin _____ 106—58
3,026,211 3/1962 Cutler _____ 106—63

HELEN M. McCARTHY, *Acting Primary Examiner.*

TOBIAS E. LEVOW, *Examiner.*

J. E. POER, *Assistant Examiner.*